(12) United States Patent
Sherpa et al.

(10) Patent No.: US 12,470,828 B1
(45) Date of Patent: Nov. 11, 2025

(54) SYSTEMS AND METHODS FOR FRAMING VIDEOS BASED ON MOTION

(71) Applicant: GoPro, Inc., San Mateo, CA (US)

(72) Inventors: David Sherpa, Paris (FR); Emmanuel Simon, Asnières-sur-Seine (FR)

(73) Assignee: GoPro, Inc., San Mateo, CA (US)

(*) Notice: Subject to any disclaimer, the term of this patent is extended or adjusted under 35 U.S.C. 154(b) by 0 days.

(21) Appl. No.: 18/959,254

(22) Filed: Nov. 25, 2024

Related U.S. Application Data (60) Provisional application No. 63/609,085, filed on Dec. 12, 2023.

(51) Int. Cl.
*H04N 23/698* (2023.01)
*G06T 3/08* (2024.01)
*G06T 7/215* (2017.01)
*G06T 7/80* (2017.01)

(52) U.S. Cl.
CPC .............. *H04N 23/698* (2023.01); *G06T 3/08* (2024.01); *G06T 7/215* (2017.01); *G06T 7/80* (2017.01); *G06T 2207/10016* (2013.01); *G06T 2207/30244* (2013.01)

(58) Field of Classification Search
CPC .................................. G01L 5/14; G01N 3/40
See application file for complete search history.

(56) References Cited

U.S. PATENT DOCUMENTS

| | | | |
|---|---|---|---|
| 9,807,403 B2* | 10/2017 | Chong | H04N 19/196 |
| 10,778,895 B1* | 9/2020 | Garcia | G06T 7/30 |
| 2022/0030264 A1* | 1/2022 | Niamut | H04N 19/52 |
| 2022/0038709 A1* | 2/2022 | Da Silva Pratas Gabriel | H04N 19/105 |
| 2023/0051412 A1* | 2/2023 | da Silva Pratas Gabriel | H04N 19/105 |

* cited by examiner

*Primary Examiner* — Md N Haque
(74) *Attorney, Agent, or Firm* — Esplin & Associates, PC (57) ABSTRACT

Motion of an image capture device during capture of a video, such as a spherical video, is utilized to frame visual content of the video. The motion of the image capture device during video capture is used to determine how the visual content will be framed (e.g., for presentation, for inclusion in a video clip/video edit). The motion of the image capture device during video capture is determined using the visual content projected onto a plane using stereographic projection.

15 Claims, 7 Drawing Sheets

SYSTEMS AND METHODS FOR FRAMING VIDEOS BASED ON MOTION

FIELD

This disclosure relates to framing videos based on image capture device motion during capture of the videos.

BACKGROUND

A user may use an image capture device to capture a video. Manually reviewing the video to determine framing of the video may be difficult and time consuming.

SUMMARY

This disclosure relates to framing videos based on motion. Video information and/or other information may be obtained. The video information may define a spherical video. The spherical video may be captured by an image capture device. The spherical video may have a progress length. The spherical video may include spherical visual content viewable as a function of progress through the progress length of the spherical video. The spherical visual content may be projected onto a plane using a stereographic projection. The direction of motion of the image capture device during capture of the spherical video may be determined based on the spherical visual content projected onto the plane using the stereographic projection and/or other information. Framing of the spherical video may be determined based on the direction of motion of the image capture device during the capture of the spherical video and/or other information. The framing of the spherical video may define positioning of a viewing window for the spherical visual content.

A system for framing videos based on motion may include one or more electronic storages, one or more processors, and/or other components. An electronic storage may store video information, information relating to a video, information relating to visual content, information relating to projection of visual content, information relating to an image capture device, information relating to motion of the image capture device, information relating to directions of motion of the image capture device, information relating to framing of the video, information relating to a viewing window, and/or other information.

The processor(s) may be configured by machine-readable instructions. Executing the machine-readable instructions may cause the processor(s) to facilitate framing videos based on motion. The machine-readable instructions may include one or more computer program components. The computer program components may include one or more of a video component, a projection component, a direction component, a framing component and/or other computer program components.

The video component may be configured to obtain video information and/or other information. The video information may define a spherical video. The spherical video may be captured by an image capture device. The spherical video may have a progress length. The spherical video may include spherical visual content viewable as a function of progress through the progress length of the spherical video.

The projection component may be configured to project the spherical visual content onto a plane. The spherical visual content may be projected onto the plane using a stereographic projection and/or other projections.

The direction component may be configured to determine the direction of motion of the image capture device during capture of the spherical video. The direction of motion of the image capture device during the capture of the spherical video may be determined based on the spherical visual content projected onto the plane and/or other information. The direction of motion of the image capture device during the capture of the spherical video may be determined based on the spherical visual content projected onto the plane using the stereographic projection and/or other information.

In some implementations, the direction of motion of the image capture device may be determined as a function of progress through the progress length of the spherical video.

In some implementations, the projection of the spherical visual content using the stereographic projection may reduce perspective effect for determination of the direction of motion of the image capture device.

In some implementations, the direction of motion of the image capture device during the capture of the spherical video may be determined based on an optical flow of the spherical visual content projected onto the plane using the stereographic projection.

In some implementations, the direction of motion of the image capture device determined based on the spherical visual content projected onto the plane using the stereographic projection may include a direction perpendicular to a view generated using the stereographic projection. For example, the spherical visual content may be projected using the stereographic projection to generate a top-down little planet view, and the direction of motion determined based on the spherical visual content projected onto the plane using the stereographic projection may include a horizontal direction of motion of the image capture device. The spherical visual content may be projected using the stereographic projection to generate a side-side little planet view, and the direction of motion determined based on the spherical visual content projected onto the plane using the stereographic projection includes a vertical direction of motion of the image capture device.

In some implementations, the direction of motion of the image capture device for a first segment of the progress length of the spherical video may be determined based on the spherical visual content projected onto the plane using the stereographic projection, and the direction of motion of the image capture device for a second segment of the progress length of the spherical video different from the first segment may be determined based changes in GPS location of the image capture device.

The framing component may be configured to determine framing of the spherical video. The framing of the spherical video may be determined based on the direction of motion of the image capture device during the capture of the spherical video and/or other information. The framing of the spherical video may define positioning of a viewing window for the spherical visual content.

In some implementations, the framing of the spherical video may be determined as the function of progress through the progress length of the spherical video.

In some implementations, the framing of the spherical video may be determined based on the direction of motion of the image capture device during the capture of the spherical video to position the viewing window in the direction of motion of the image capture device.

In some implementations, the framing of the spherical video for the first segment of the progress length of the spherical video may be determined based on the direction of motion of the image capture device derived from the spherical visual content projected onto the plane using the stereographic projection, and the framing of the spherical video for the second segment of the progress length of the spherical video may be determined based on the direction of motion of the image capture device derived from the changes in GPS location of the image capture device.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
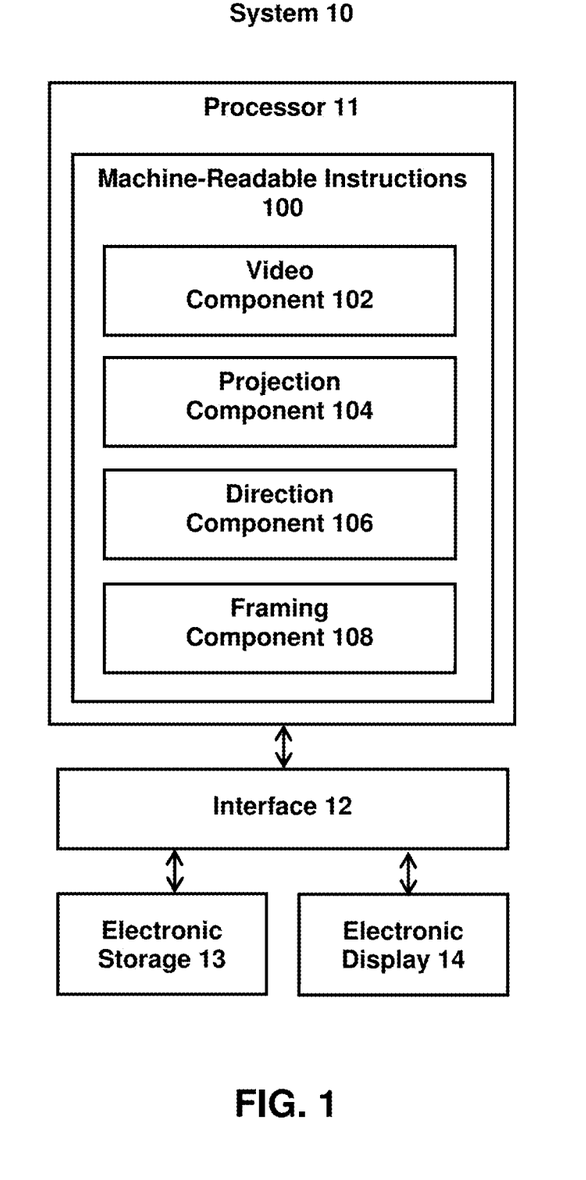
FIG. 1 illustrates an example system for framing videos based on motion.

FIG. 1 illustrates a system 10 for framing videos based on motion. The system 10 may include one or more of a processor 11, an interface 12 (e.g., bus, wireless interface), an electronic storage 13, an electronic display 14, and/or other components. Video information and/or other information may be obtained by the processor 11. The video information may define a spherical video. The spherical video may be captured by an image capture device. The spherical video may have a progress length. The spherical video may include spherical visual content viewable as a function of progress through the progress length of the spherical video. The spherical visual content may be projected, by the processor 11, onto a plane using a stereographic projection. The direction of motion of the image capture device during capture of the spherical video may be determined by the processor 11 based on the spherical visual content projected onto the plane using the stereographic projection and/or other information. Framing of the spherical video may be determined by the processor 11 based on the direction of motion of the image capture device during the capture of the spherical video and/or other information. The framing of the spherical video may define positioning of a viewing window for the spherical visual content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to visual content, information relating to projection of visual content, information relating to an image capture device, information relating to motion of the image capture device, information relating to directions of motion of the image capture device, information relating to framing of the video, information relating to a viewing window, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present video information, information relating to a video, information relating to visual content, information relating to projection of visual content, information relating to an image capture device, information relating to motion of the image capture device, information relating to directions of motion of the image capture device, information relating to framing of the video, information relating to a viewing window, and/or other information.

In some implementations, the electronic display 14 may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. The electronic display 14 may be a standalone device or a component of a computing device, such as an electronic display of a mobile device (e.g., camera, smartphone, smartwatch, tablet, laptop) or a desktop device (e.g., monitor). User interaction with elements of graphical user interface(s) may be received through the electronic display (e.g., touchscreen display) and/or other user interface devices (e.g., keyboard, mouse, trackpad).

Visual content may refer to content of image(s), video frame(s), and/or video(s) that may be consumed visually. For example, visual content may be included within one or more images and/or one or more video frames of a video. The video frame(s) may define/contain the visual content of the video. The video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11, the interface 12, the electronic storage 13, and/or the electronic display 14 of the system 10 may be carried by the housing of the image capture device. The image capture device may carry other components, such as one or more optical elements and/or one or more image sensors. References to the housing of an image capture device may refer to the image capture device, and vice versa.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet).

A video with a wide field of view may be captured by the image capture device 300. A video with a wide field of view may depict a large portion of a scene. For example, a spherical video may be captured by the image capture device. A spherical video may include a recording of views in every direction around the image capture device. The spherical video may include visual content with a spherical field of view. The visual content with the spherical field of view may be referred to as spherical visual content. The spherical visual content may include the entire sphere (e.g., 360 degrees of azimuth and 180 degrees from nadir to zenith) or one or more parts of the sphere.

The wide field of view of the video may make it difficult for a user to see every spatial extent of the scene depicted within the video at once. A user may wish to extract particular spatial extents of the video for presentation and/or to create a two-dimensional video. Manually reviewing the footage to identify moments in the video to include in presentation/2D video and to identify which spatial extents of the video to include in the presentation/2D video may be difficult and time consuming.

The present disclosure utilizes motion of the image capture device during capture of the video to frame the visual content of the video. The motion of the image capture device during video capture is used to determine how the visual content will be framed (e.g., for presentation, for inclusion in a video clip/video edit). For example, the visual content may be framed to be centered on the direction of motion of the image capture device. The visual content may be framed to provide a view in the direction in which the image capture device moved during video capture (e.g., front, back, left right, up, down). The visual content may be framed to provide a view that is aligned with the direction of image capture device motion.

The direction of image capture device motion may be determined based on motion estimation of the visual content of videos captured by the image capture device. Motion estimation may include determination of optical flow within the video. Optical flow may include pattern of apparent motion of things depicted within the visual content of the video. Optical flow may be determined based on changes in locations of pixels that depict a particular thing between adjacent video frames. Optical flow may include estimation of local motion vectors between adjacent video frames.

Classical two-dimensional views of visual content may include perspective depiction of things, where the size and angles of how things are depicted indicate the relative position of the things from the image capture device. Perspective depiction may make motion estimation difficult/complicated. To determine the direction of image capture device motion from visual content with perspective depiction, the effects of perspective on the direction of optical flow must be addressed.

Figure 3:
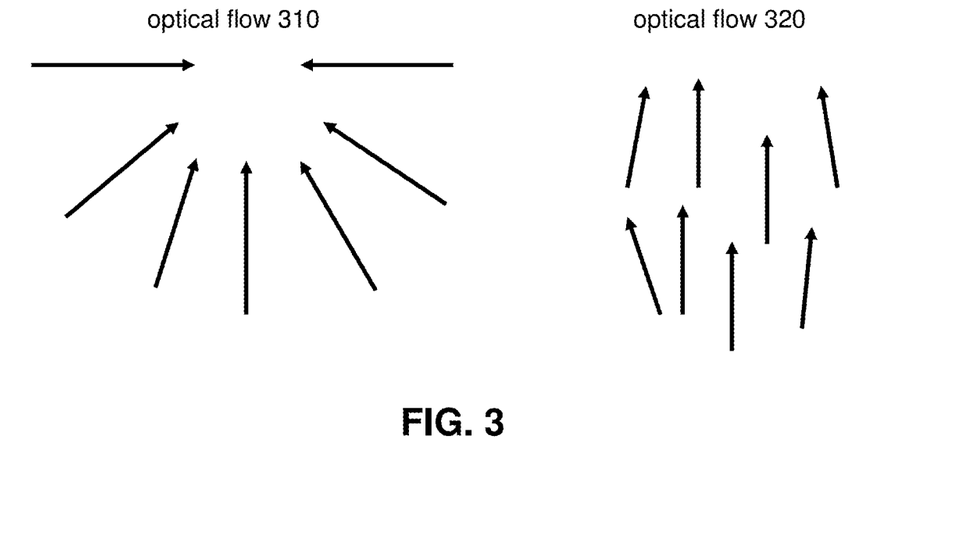
FIG. 3 illustrates examples of optical flow within a video.

For example, FIG. 3 illustrates examples of optical flow 310, 320 within a video. The optical flow 310 may show movement of pixels that depict particular things/objects across multiple video frames. The optical flow 310 may show movement of pixels as the image capture device moves forward/backward. Due to the perspective depiction within the visual content, the local motion vectors of the pixels may appear to converge to a point. Such result of perspective depiction may be referred to as perspective effect. To determine the direction of image capture device motion from the optical flow 310, this perspective effect must be addressed.

The present disclosure reduces/eliminates the perspective effect within the visual content for determination of image capture device motion. The visual content (spherical visual content) of the video (spherical video) may be projected onto a plane using a stereographic projection. The visual content may be projected onto the plane using the stereographic projection to produce a little planet view. Such projection of the visual content may reduce/eliminate the perspective effect in determining the direction of image capture device motion. Use of the stereographic projection may enable greater spatial extent/field of view of the visual content to be used in determining the direction of image capture device motion. For example, use of classical reframing towards the visual content that depicts the ground to estimate motion vectors may limit the amount of the spatial extent/field of view of the visual content that may be used due to the perspective effect. Use of the stereographic projection may enable spatial extent/field of view of the visual content beyond just those depicting the ground to be used in determining the direction of image capture device motion. For example, use of the stereographic projection reduces/eliminates the perspective effect within the spatial extent/field of view of the visual content that depict sides of the scene (e.g., depicting the environment around the image capture device, such as structures, trees, walls, etc.), and enables these parts of the visual content to be used to estimate motion vectors and determine the direction of image capture device motion.

For example, the optical flow 320 in FIG. 3 may show movement of pixels across multiple video frames when spherical visual content of video frames are projected using stereographic projection. The optical flow 320 may show movement of pixels as the image capture device moves forward/backward. In the little planet view, the local motion vectors of the pixels may tend to align with the direction of image capture device motion. In the little planet view, the perspective effect may be reduced/eliminated such that the direction of image capture device motion is obtained by averaging the optical flow 320.

The projection of spherical visual content using the stereographic projection may result in a portion of the projected visual content including motion vectors that align with the image capture device motion. To determine the direction of image capture device motion, the movement of pixels within this portion of the projected visual content may be used. For example, the entirety of the spherical visual content may be projected onto a plane using the stereographic projection, and a certain amount of edges/periphery of the projected visual content may not be used to determine the direction of image capture device motion. For instance, the edges/periphery of the projected visual content that includes a certain amount of distortion (e.g., more than a threshold distorted amount) may be cropped out from use. After the entire spherical visual content is projected, a zoomed in view of the projected visual content may be used in determining the direction of image capture device motion.

As another example, a portion of the spherical visual content may be projected onto a plane using the stereographic projection for use in determining the direction of image capture device motion. For example, a top part (e.g., top half, top third, top fourth) of the spherical visual content may not be projected onto the plane, and the lower part (e.g., bottom half, bottom two-thirds, bottom three-fourths) of the spherical visual content projected onto the plane may be used in determining the direction of image capture device motion.

Such projection of visual content may enable faster and lower-cost analysis to be performed to determine the direction of image capture device motion. For example, gradient estimation may be performed to determine the direction of image capture device motion. As another example, the intensity of the projected visual content may be translated into a one dimensional signal, with lower pixel values resulting in a low signal/lower part of a curve and higher pixel values resulting in higher signal/higher part of the curve. Signal correlation may be performed to determine shifts in signal (e.g., vertical shift, horizontal shift), and the shifts in signal may be used to determine the direction of image capture device motion.

Figure 4A:
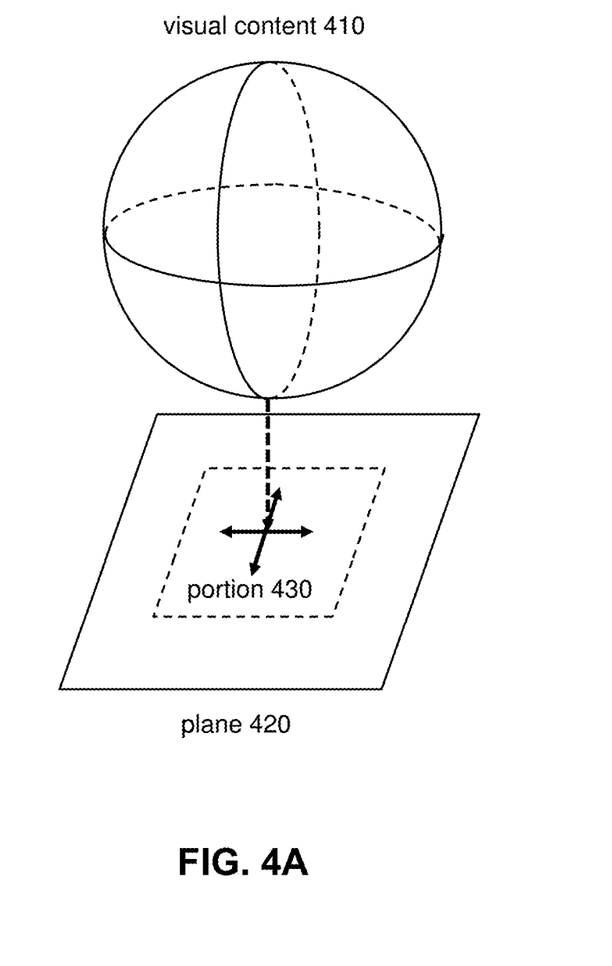
FIG. 4A illustrates an example projection of visual content.
Figure 4B:
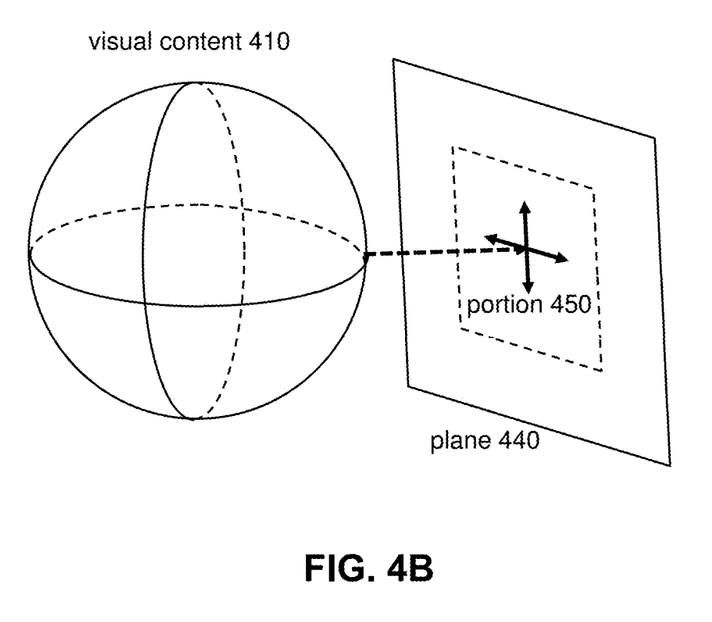
FIG. 4B illustrates an example projection of visual content.

Projection of spherical visual content using the stereographic projection may generate a view of the spherical visual content in a particular direction, and this view may be used to determine direction of image capture device motion that is perpendicular to the view generated using the stereographic projection. FIG. 4A illustrates an example projection of visual content 410. The visual content 410 may be projected onto a plane 420 using a stereographic projection. The bottom point/nadir of the visual content 410 may be projected on the center of the plane 420. Such projection of the visual content 410 may generate a top-down little planet view of the visual content 410. The top-down little planet view of the visual content 10 may include projection in the direction of gravity on the image capture device during capture of the visual content 410. The projected visual content within the top-down little planet view may be used to determine horizontal directions of image capture device motion. The projected visual content within the top-down little planet view may be used to determine whether/when the image capture device is moving forwards/backwards and/or laterally. The entirety of the visual content 410 projected onto the plane 420 may be used to determine the directions of image capture device motion. A portion 430 of the visual content 410 projected onto the plane 420 may be used to determine the directions of image capture device motion. FIG. 4B illustrates an example projection of visual content 410. The visual content 410 may be projected onto a plane 440 using a stereographic projection. The left point of the visual content 410 may be projected on the center of the plane 440. Such projection of the visual content 410 may generate a side-side (side to side, left-right, right-left) little planet view of the visual content 410. The projected visual content within the side-side little planet view may be used to determine vertical directions and horizontal directions of image capture device motion. The projected visual content within the side-side little planet view may be used to determine whether/when the image capture device is moving up/down and/or forwards/backwards. The entirety of the visual content 410 projected onto the plane 440 may be used to determine the directions of image capture device motion. A portion 450 of the visual content 410 projected onto the plane 440 may be used to determine the directions of image capture device motion.

The directions of image capture device motion derived from the projected visual content may be used with and/or as alternative to directions of image capture device motion derived from other information. For example, the directions of image capture device motion derived from the projected visual content may be used with and/or as alternative to directions of image capture device motion derived from changes in GPS location of the image capture device. For example, the image capture device may carry a GPS sensor that enables the location of the image capture device to be tracked. The image capture device may carry other location sensors, such as a magnetometer that enables the relative orientation of the image capture device with respect to magnetic/geographic north to be determined. The directions of image capture device motion derived from the projected visual content may be used to confirm/modify the directions of image capture device motion derived from changes in GPS location of the image capture device. The directions of image capture device motion derived from the projected visual content may be used when the directions of image capture device motion derived from changes in GPS location are not available/reliable (e.g., GPS signal is lost, north estimation confidence is low).

Referring back to FIG. 1, the processor 11 (or one or more components of the processor 11) may be configured to obtain information to facilitate framing videos based on motion s. Obtaining information may include one or more of accessing, acquiring, analyzing, capturing, determining, examining, generating, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate framing videos based on motion. The machine-readable instructions 100 may include one or more computer program components. The machine-readable instructions 100 may include one or more of a video component 102, a projection component 104, a direction component 106, a framing component 108 and/or other computer program components.

The video component 102 may be configured to obtain video information and/or other information. In some implementations, the video information component 102 may obtain video information based on user interaction with a user interface/application (e.g., video editing application, video player application), and/or other information. For example, a user interface/application may provide option(s) for a user to play and/or edit videos. The video information for a video may be obtained based on the user's selection of the video through the user interface/video application. In some implementations, the video information component 102 may obtain video information during capture of the video. In some implementations, the video information component 102 may obtain video information after capture of the video. Other selections of a video for retrieval of video information are contemplated.

The video information may define a video (e.g., a wide field of view video, a spherical video). The video may be captured by an image capture device. The video may have a progress length. The video may include visual content viewable as a function of progress through the progress length of the video. For example, the spherical video may include spherical visual content viewable as a function of progress through the progress length of the spherical video. For example, a video may have a time duration of 60 seconds. A video may have 1800 video frames. A video having 1800 video frames may have a play time duration of 60 seconds when viewed at 30 frames per second. Other progress lengths, time durations, and frame numbers of videos are contemplated.

The visual content may have a field of view. A field of view of a video/visual content may refer to a field of view of a scene captured within the video/visual content (e.g., within video frames). A field of view of a video/visual content may refer to the extent of a scene that is captured within the video/visual content. A wide field of view video may refer to a video with a wide field of view. A wide field of view may refer to a field of view that is larger/wider than a threshold field of view/angle. For example, a wide field of view may refer to a field of view that is larger/wider than 60-degrees. A spherical video may refer to a video with a spherical field of view. Spherical field of view may include 360-degrees of capture. Spherical field of view may include views in all directions surrounding the image capture device. A spherical video may include a complete spherical field of view or a partial spherical field of view. Other fields of view of videos are contemplated. A wide field of view/spherical video may include and/or may be associated with spatial audio.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers.

The projection component 104 may be configured to project the visual content of the video onto one or more planes. The projection component 104 may be configured to project the entirety of the visual content onto a plane or one or more portions of the visual content onto the plane. The projection component 104 may be configured to project the visual content of the video onto a plane using a projection. The projection may determine how the visual content of the video is mapped onto a surface.

For example, the projection component 104 may be configured to project the spherical visual content of the spherical video onto one or more planes. The visual content/spherical visual content may be projected onto the plane(s) using a stereographic projection and/or other projections. The stereographic projection may map the spherical visual content onto one or more flat images (e.g., top-down image, side-side image). The stereographic projection may be used to generate one or more little planet views of the spherical visual content (top-down little planet view, side-side little planet view). Use of other projections is contemplated.

In some implementations, different amounts of the spherical visual content may be projected onto a plane to generate different little planet views for use in determining the direction of image capture device motion. For example, a larger spatial extent/field of view of the spherical visual content may be projected onto the plane to generate the top-down little planet view for use in determining horizontal directions of image capture device motion and a smaller spatial extent/field of view of the spherical visual content may be projected onto the plane to generate the side-side little planet view for use in determining vertical directions of image capture device motion. For example, the side-side little planet view may be generated by projecting middle part of the sphere and not projecting the top part of the sphere (depicting the upper part of the video) and the bottom part of the sphere (depicting the ground).

The direction component 106 may be configured to determine the direction(s) of motion of the image capture device during capture of the video. Determining the direction(s) of motion of the image capture device during capture of the video may include ascertaining, calculating, computing, establishing, finding, setting, and/or otherwise determining direction of motion of the image capture device. The direction(s) of motion of the image capture device during the capture of the video may be determined based on the visual content projected onto the plane(s) and/or other information. For example, the direction(s) of motion of the image capture device during the capture of the spherical video may be determined based on the spherical visual content projected onto the plane(s) and/or other information. The direction of motion of the image capture device during the capture of the video may be determined based on the visual content projected onto the plane using the stereographic projection and/or other information.

The direction of motion of the image capture device may be determined as a function of progress through the progress length of the video. The direction of motion of the image capture device may be determined for different moments (e.g., points in time, durations of time) in the video. Separate directions of motion of the image capture device may be determined for separate moments in the videos.

The direction(s) of the motion of the image capture device during the capture of the video may be determined based on analysis of the visual content projected onto the plane(s) and/or other information. Analysis of the visual content may include examination, evaluation, processing, studying, and/or other analysis of the visual content. For example, analysis of the visual content may include examination, evaluation, processing, studying, and/or other analysis of one or more visual features/characteristics of the visual content. Analysis of the visual content may include analysis of visual content of multiple video frames. Visual features and/or visual characteristics of multiple video frames (e.g., captured at different moment, captured over a duration of time) may be analyzed to determine the direction(s) of the motion of the image capture device. The analysis of the visual content may be performed on the entirety of the visual content projected onto the plane(s) and/or on one or more portions of the visual content projected onto the plane(s).

For example, one or more image motion analysis techniques (e.g., fast shader based optical flow, gradient analysis, signal correlation) may be used to determine the direction(s) of the motion of the image capture device. For instance, the direction(s) of motion of the image capture device during the capture of the spherical video may be determined based on an optical flow of the spherical visual content projected onto the plane(s) using the stereographic projection. The projection of the spherical visual content using the stereographic projection may reduce perspective effect for determination of the direction of motion of the image capture device.

Figure 5:
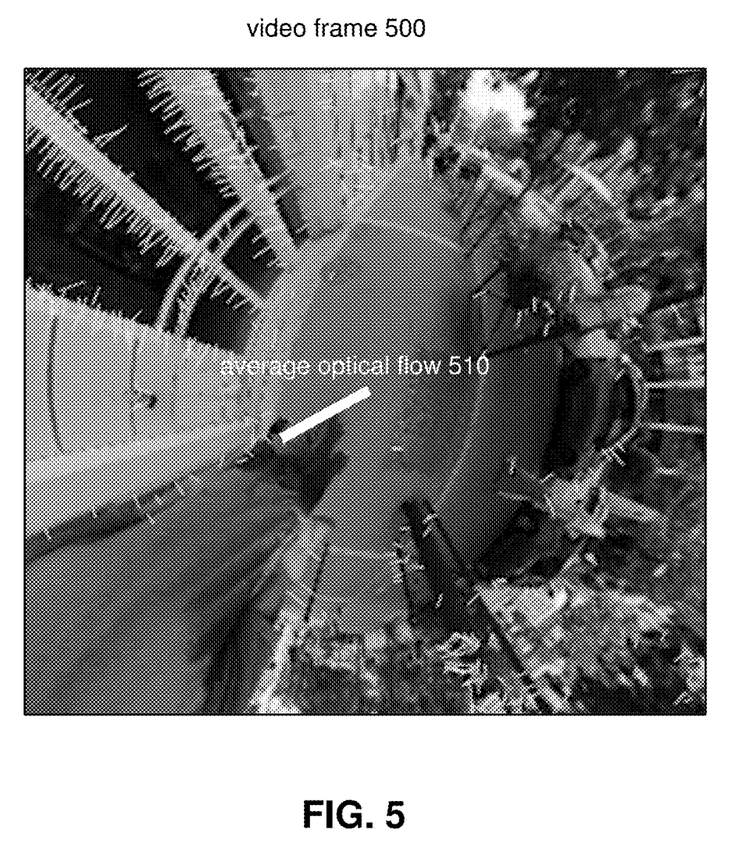
FIG. 5 illustrates examples of optical flow within a video.

FIG. 5 illustrates examples of optical flow within a video. FIG. 5 may show a top-down little planet view of a video frame 500 of a spherical video. In the top-down little planet view, the local motion vectors of the pixels of the video frame 500 may align with the horizontal direction(s) of the image capture device motion. In the top-down little planet view, the perspective effect may be reduced/eliminated such that the horizontal direction of image capture device motion for a moment in the spherical video is obtained by averaging the optical flow. That is, an average optical flow 510 may be aligned with the horizontal direction in which the image capture device was moving at the time the video frame 500 was captured.

In some implementations, the direction(s) of motion of the image capture device determined based on the spherical visual content projected onto the plane using the stereographic projection may include a direction perpendicular to a view generated using the stereographic projection. For example, the spherical visual content may be projected using the stereographic projection to generate a top-down little planet view, and the direction of motion determined based on the spherical visual content projected onto the plane using the stereographic projection may include a horizontal direction (forwards/backwards, laterally) of motion of the image capture device. The spherical visual content may be projected using the stereographic projection to generate a side-side little planet view, and the direction of motion determined based on the spherical visual content projected onto the plane using the stereographic projection includes a vertical direction (e.g., up/down) of motion of the image capture device. The side-side little planet view may enable determination of horizontal direction of motion as well (e.g., forwards/backwards for left-to-right or right-to-left view, laterally for front-to-back or back-to-front view).

In some implementations, the direction of motion of the image capture device for different segments of the progress length of the video may be determined using different techniques. For example, the direction of motion of the image capture device for one segment of the progress length of the spherical video may be determined based on the spherical visual content projected onto the plane using the stereographic projection, and the direction of motion of the image capture device for another segment of the progress length of the spherical video may be determined based changes in GPS location of the image capture device.

In some implementations, the horizontal and vertical directions of motion of the image capture device may be determined in sequence. For example, the top-down little planet view may be generated to determine the image capture device motion in the horizontal direction. Based on the motion of the image capture device in the horizontal direction and the direction of gravity on the image capture device, the left and/or right sides of the spherical visual content may be determined. For example, the left and right sides of the spherical visual content may be determined to be at right angle with both the horizontal direction of motion and the direction of gravity, with the left side being to the left of the horizontal direction of motion and the right side being to the right of the horizontal direction of motion. The vertical direction of motion of the image capture device may be determined based on analysis of the visual content within the left and/or right side of the spherical visual content. For example, motion vectors within a spatial extent of the visual content centered on the left and/or right side of the spherical visual content may be averaged to determine whether the image capture device was moving upwards or downward during video capture. A smaller spatial extent of the visual content may be used to determine the vertical direction of motion than the horizontal direction of motion. The smaller spatial extent of the visual content used to determine the vertical direction of motion may be projected onto a plane using stereographic projection or other projection (e.g., equirectangular projection). Analysis of the visual content within the left side and the right side of the spherical visual content may be combined (e.g., averaged) to refine the vertical motion estimation.

The framing component 108 may be configured to determine framing of the video (e.g., spherical video). Determining framing of the video may include determining framing of the visual content of the video. Determining framing of the video may include ascertaining, calculating, computing, establishing, finding, setting, and/or otherwise determining the framing of the video. The framing of the video may be determined as the function of progress through the progress length of the video.

The framing of the video may refer to how the visual content of the video is manipulated for presentation and/or included in a video clip/video edit. The framing of the video may define positioning of a viewing window for the visual content of the video. For example, the framing of the spherical video may define positioning of a viewing window for the spherical visual content of the spherical video. The positioning of the viewing window for the visual content of the video may refer to the positioning of the viewing window within the field of view of the visual content. The framing of the video may define where and how the viewing window is placed within the field of view of the visual content. The framing of the video may define where and how the viewing window is placed within the spherical visual content.

A viewing window may define the extents of the visual content to be included within a presentation of the video and/or included within a video clip/video edit. A viewing window may define extents of the visual content to be included within a punchout of the visual content. A punchout of visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial parts of the visual content.

A punchout of visual content may include output of a virtual camera. A virtual camera may define one or more spatial extents of the visual content to be output (e.g., for presentation, for storage) based on orientation of the virtual camera with respect to the visual content of the video. A virtual camera may represent the point of view from which different spatial extents of the visual content are observed. Different punchouts of the visual content may include outputs of different virtual cameras to provide views of differential spatial parts of the visual content.

Positioning of a viewing window within the field of view of the visual content may refer to placement of the viewing window within the field of view of the visual content. The positioning/placement of the viewing window may be defined by one or more of viewing direction, viewing size, viewing rotation, and/or other information. Individual framing of the visual content may define (e.g., determine, establish, include, set) positioning of the viewing window within the field of view of the visual content based on the corresponding viewing direction, viewing size, viewing rotation, and/or other information. An individual framing of the visual content may define arrangement of pixels within the viewing window for presentation. The arrangement of the pixels within the viewing window may be defined by viewing projection and/or other information. Individual framing of the visual content may define corresponding viewing projection of the visual content within the viewing window.

A viewing direction may define a direction of view for a viewing window. A viewing direction may define the angle/visual portion of the visual content at which a viewing window may be directed. A viewing size may define the size of the viewing window. A viewing size may define a size (e.g., size, magnification, viewing angle) of viewable extents of visual content within the viewing window. A viewing size may define the dimension/shape of the viewing window. A viewing rotation may define a rotation of the viewing window. A viewing rotation may define one or more rotations of the viewing window about one or more axis. A viewing projection may define how pixels within the viewing window is arranged for presentation on an electronic display. A viewing projection may define how the pixels of an image are arranged to form the visual content. A viewing projection may refer to how portions of the visual content/pixels are mapped onto a surface (e.g., two-dimensional plane).

The framing of the video may be determined based on the direction of motion of the image capture device during the capture of the video and/or other information. One or more of viewing direction, viewing size, viewing rotation, and/or viewing projection for the viewing window may be determined based on the direction of motion of the image capture device during the capture of the video. For example, the framing of the video may be determined based on the direction of motion of the image capture device during the capture of the video to position the viewing window in the direction of motion of the image capture device. The framing of the video may be determined based on the direction of motion of the image capture device during the capture of the video to provide a view in the direction in which the image capture device moved during video capture (e.g., front, back, left right, up, down). The framing of the video may be determined based on the direction of motion of the image capture device during the capture of the video to provide a view that is aligned with the direction of image capture device motion. The framing of the video may be determined to include the direction of image capture device motion at the center/within a center area of the viewing window. The framing of the video may change to follow the direction of image capture device motion.

As another example, the framing of the video may be determined based on the direction of motion of the image capture device during the capture of the video to position the viewing window with respect to the direction of motion of the image capture device. The framing of the video may be determined with the direction of motion of the image capture device during the capture of the video providing a reference for the framing. The framing of the video may be determined based on the direction of motion of the image capture device during the capture of the video to provide a view with respect to the motion of the image capture device during the capture of the video to (e.g., a back view that is opposite the direction of image capture device motion, a side/top/bottom view that is perpendicular to the direction of image capture device motion). Other framing of the video is contemplated.

Figure 6A:
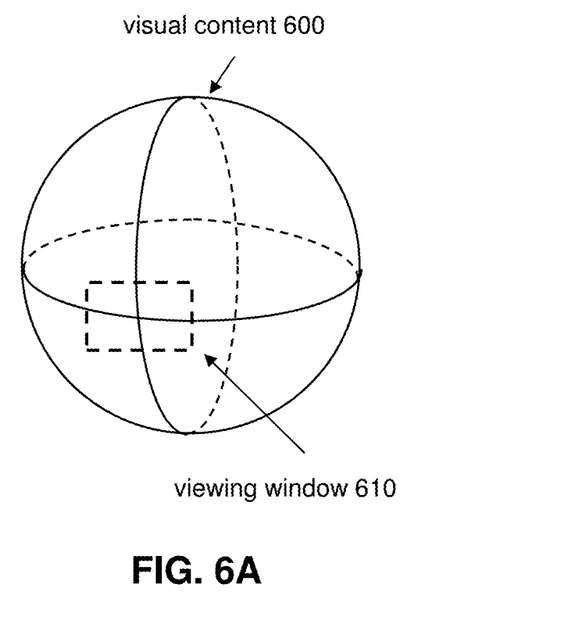
FIG. 6A illustrates an example positioning of a viewing window.

For example, FIGS. 6A and 6B illustrate example positioning of a viewing window 610. With respect to FIG. 6A, the visual content 600 may have been captured while the image capture device was moving forwards. The direction of image capture device motion may be determined to be pointed towards the front of the visual content 600. Based on the direction of image capture device motion in the forward direction, the viewing window 610 may be positioned to be centered on the front of the visual content 600.

Figure 6B:
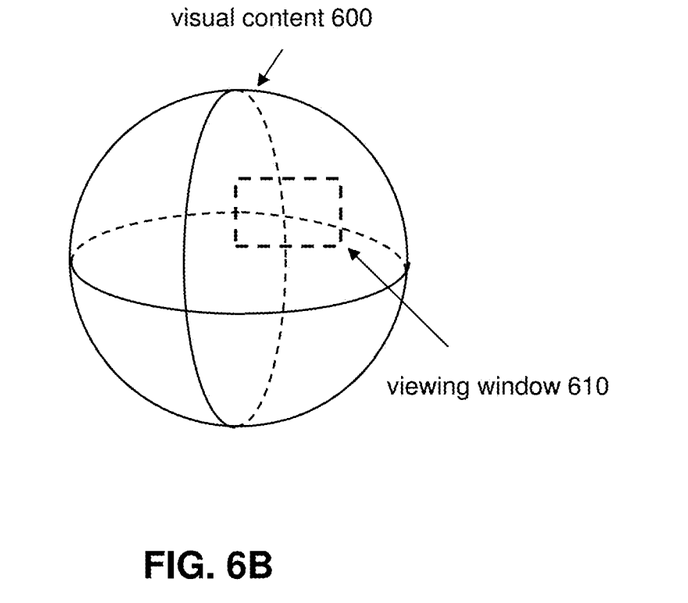
FIG. 6B illustrates an example positioning of a viewing window.

With respect to FIG. 6B, the visual content 600 may have been captured while the image capture device was moving backwards. The direction of image capture device motion may be determined to be pointed towards the back of the visual content 600. Based on the direction of image capture device motion in the backward direction, the viewing window 610 may be positioned to be centered on the back of the visual content 600.

In some implementations, the framing of the video for different segments of the progress length of the video may be determined based on the directions of the motion of the image capture device derived using different techniques. For example, the framing for one segment of the progress length of the spherical video may be determined based on the direction of motion of the image capture device derived from the spherical visual content projected onto the plane(s) using the stereographic projection, and the framing for another segment of the progress length of the spherical video may be determined based on the direction of motion of the image capture device derived from the changes in GPS location of the image capture device.

The framing of the video may be used to generate a presentation of the video. The visual content of the video within the viewing window may be presented on one or more electronic displays. The visual content of the video within the viewing window may be used to generate a video clip (e.g., 2D video, video summary, video edit). The video clip may be stored in the electronic storage 13.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementations, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of the computer program components may provide more or less functionality than is described. For example, one or more of the computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
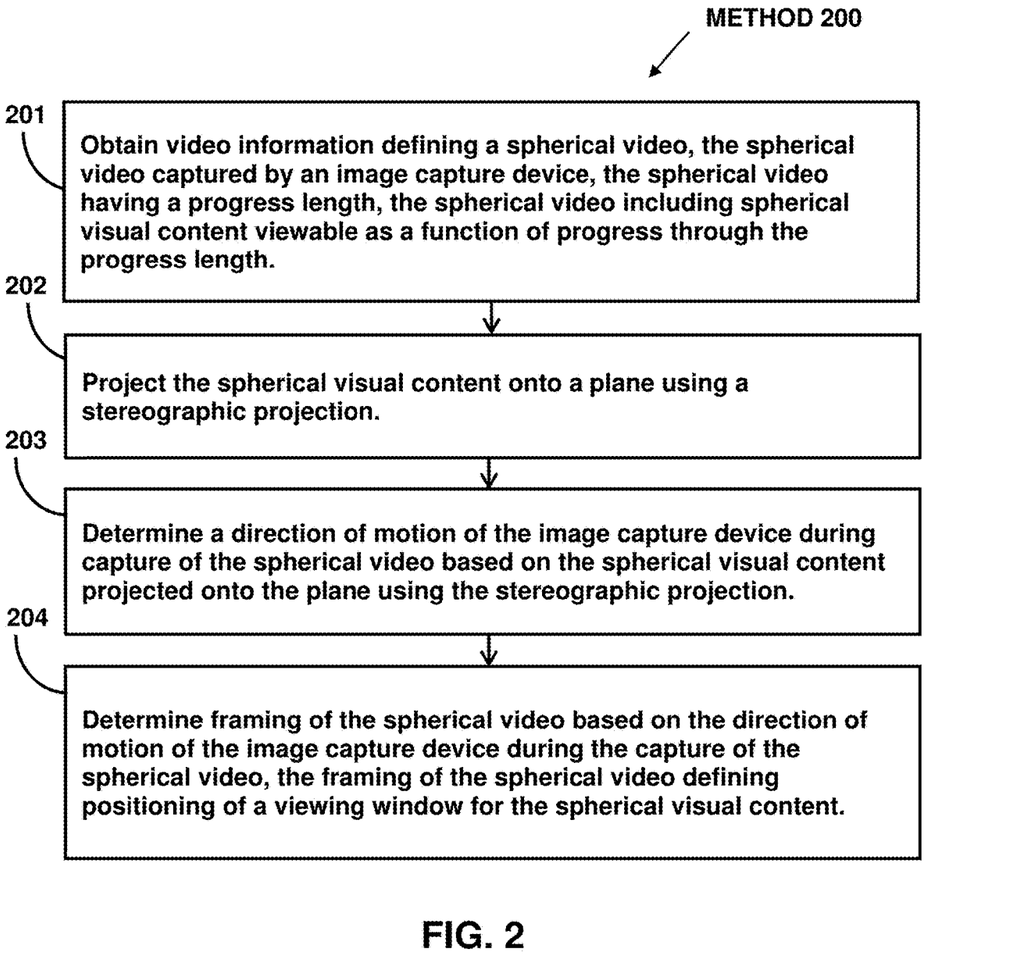
FIG. 2 illustrates an example method for framing videos based on motion.

FIG. 2 illustrates method 200 for framing videos based on motion. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a spherical video. The spherical video may be captured by an image capture device. The spherical video may have a progress length. The spherical video may include spherical visual content viewable as a function of progress through the progress length of the spherical video. In some implementations, operation 201 may be performed by a processor component the same as or similar to the video component 102 (Shown in FIG. 1 and described herein).

At operation 202, the spherical visual content may be projected onto a plane using a stereographic projection. In some implementations, operation 202 may be performed by a processor component the same as or similar to the projection component 104 (Shown in FIG. 1 and described herein).

At operation 203, the direction of motion of the image capture device during capture of the spherical video may be determined based on the spherical visual content projected onto the plane using the stereographic projection and/or other information. In some implementations, operation 203 may be performed by a processor component the same as or similar to the direction component 106 (Shown in FIG. 1 and described herein).

At operation 204, framing of the spherical video may be determined based on the direction of motion of the image capture device during the capture of the spherical video and/or other information. The framing of the spherical video may define positioning of a viewing window for the spherical visual content. In some implementations, operation 204 may be performed by a processor component the same as or similar to the framing component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for framing videos based on motion, the system comprising:
   one or more physical processors configured by machine-readable instructions to:
   obtain video information defining a spherical video, the spherical video captured by an image capture device, the spherical video having a progress length, the spherical video including spherical visual content viewable as a function of progress through the progress length;
   project the spherical visual content onto a plane using a stereographic projection to generate a top-down little planet view;
   determine a direction of motion of the image capture device during capture of the spherical video based on an optical flow of the spherical visual content projected onto the plane using the stereographic projection, wherein the projection of the spherical visual content using the stereographic projection reduces perspective effect for determination of the direction of motion of the image capture device and the direction of motion determined based on the spherical visual content projected onto the plane using the stereographic projection includes a horizontal direction of motion of the image capture device; and
   determine framing of the spherical video as a function of progress through the progress length of the spherical video based on the direction of motion of the image capture device during the capture of the spherical video, the framing of the spherical video defining positioning of a viewing window for the spherical visual content, wherein the framing of the spherical video is determined based on the direction of motion of the image capture device during the capture of the spherical video to position the viewing window in the direction of motion of the image capture device.

2. A system for framing videos based on motion, the system comprising: one or more physical processors configured by machine-readable instructions to: obtain video information defining a spherical video, the spherical video captured by an image capture device, the spherical video having a progress length, the spherical video including spherical visual content viewable as a function of progress through the progress length; project the spherical visual content onto a plane using a stereographic projection; determine a direction of motion of the image capture device during capture of the spherical video based on the spherical visual content projected onto the plane using the stereographic projection, wherein the direction of motion of the image capture device determined based on the spherical visual content projected onto the plane using the stereographic projection includes a direction perpendicular to a view generated using the stereographic projection; and determine framing of the spherical video based on the direction of motion of the image capture device during the capture of the spherical video, the framing of the spherical video defining positioning of a viewing window for the spherical visual content, wherein the framing of the spherical video is determined based on the direction of motion of the image capture device during the capture of the spherical video to position the viewing window in the direction of motion of the image capture device.

3. The system of claim 2, wherein:
   the spherical visual content is projected using the stereographic projection to generate a top-down little planet view; and
   the direction of motion determined based on the spherical visual content projected onto the plane using the stereographic projection includes a horizontal direction of motion of the image capture device.

4. The system of claim 2, wherein:
the spherical visual content is projected using the stereographic projection to generate a side-side little planet view; and the direction of motion determined based on the spherical visual content projected onto the plane using the stereographic projection includes a vertical direction of motion of the image capture device.

5. The system of claim 2, wherein the projection of the spherical visual content using the stereographic projection reduces perspective effect for determination of the direction of motion of the image capture device.

6. The system of claim 2, wherein the direction of motion of the image capture device during the capture of the spherical video is determined based on an optical flow of the spherical visual content projected onto the plane using the stereographic projection.

7. The system of claim 2, wherein:
the direction of motion of the image capture device is determined as a function of progress through the progress length of the spherical video; and
the framing of the spherical video is determined as the function of progress through the progress length of the spherical video.

8. The system of claim 3, wherein
the direction of motion of the image capture device for a first segment of the progress length of the spherical video is determined based on the spherical visual content projected onto the plane using the stereographic projection; and
the direction of motion of the image capture device for a second segment of the progress length of the spherical video different from the first segment is determined based changes in GPS location of the image capture device.

9. A method for framing videos based on motion, the method performed by a computing system including one or more processors, the method comprising:
obtaining, by the computing system, video information defining a spherical video, the spherical video captured by an image capture device, the spherical video having a progress length, the spherical video including spherical visual content viewable as a function of progress through the progress length;
projecting, by the computing system, the spherical visual content onto a plane using a stereographic projection;
determining, by the computing system, a direction of motion of the image capture device during capture of the spherical video based on the spherical visual content projected onto the plane using the stereographic projection, wherein the direction of motion of the image capture device determined based on the spherical visual content projected onto the plane using the stereographic projection includes a direction perpendicular to a view generated using the stereographic projection; and
determining, by the computing system, framing of the spherical video based on the direction of motion of the image capture device during the capture of the spherical video, the framing of the spherical video defining positioning of a viewing window for the spherical visual content, wherein the framing of the spherical video is determined based on the direction of motion of the image capture device during the capture of the spherical video to position the viewing window in the direction of motion of the image capture device.

10. The method of claim 9, wherein:
the spherical visual content is projected using the stereographic projection to generate a top-down little planet view; and
the direction of motion determined based on the spherical visual content projected onto the plane using the stereographic projection includes a horizontal direction of motion of the image capture device.

11. The method of claim 9, wherein:
the spherical visual content is projected using the stereographic projection to generate a side-side little planet view; and the direction of motion determined based on the spherical visual content projected onto the plane using the stereographic projection includes a vertical direction of motion of the image capture device.

12. The method of claim 9, wherein the projection of the spherical visual content using the stereographic projection reduces perspective effect for determination of the direction of motion of the image capture device.

13. The method of claim 9, wherein the direction of motion of the image capture device during the capture of the spherical video is determined based on an optical flow of the spherical visual content projected onto the plane using the stereographic projection.

14. The method of claim 9, wherein:
the direction of motion of the image capture device is determined as a function of progress through the progress length of the spherical video; and
the framing of the spherical video is determined as the function of progress through the progress length of the spherical video.

15. The method of claim 9, wherein
the direction of motion of the image capture device for a first segment of the progress length of the spherical video is determined based on the spherical visual content projected onto the plane using the stereographic projection; and
the direction of motion of the image capture device for a second segment of the progress length of the spherical video different from the first segment is determined based changes in GPS location of the image capture device.

* * * * *